M. HICKS & T. SMITH.

CAR-LAMP.

No. 7,103. Reissued May 9, 1876.

Witnesses:
P. C. Dieterich
F. H. Duffy

Inventors:
Michael Hicks
Thomas Smith
Per: C. H. Watson & Co. Attorneys.

N. PETERS, PHOTO-LITHOGRAPHER, WASHINGTON, D. C.

UNITED STATES PATENT OFFICE.

MICHAEL HICKS AND THOMAS SMITH, OF NEW YORK, N. Y.

IMPROVEMENT IN CAR-LAMPS.

Specification forming part of Letters Patent No. 160,097, dated February 23, 1875; reissue No. 7,103, dated May 9, 1876; application filed April 27, 1876.

*To all whom it may concern:*

Be it known that we, MICHAEL HICKS and THOMAS SMITH, of New York, in the county of New York and State of New York, have invented certain new and useful Improvements in Car-Lamps; and we do hereby declare that the following is a full, clear, and exact description thereof, that will enable others skilled in the art to which it appertains to make and use the same, reference being had to the accompanying drawing, and to the letters of reference marked thereon, which form a part of this specification.

Our invention relates more particularly to lamps used in railroad-cars, steamboats, or other public places; and it consists in the construction and arrangement of a fastening for uniting the lamp to its support, the globe to the support, and the reflector to its support, as hereinafter more fully set forth.

Figure 1:
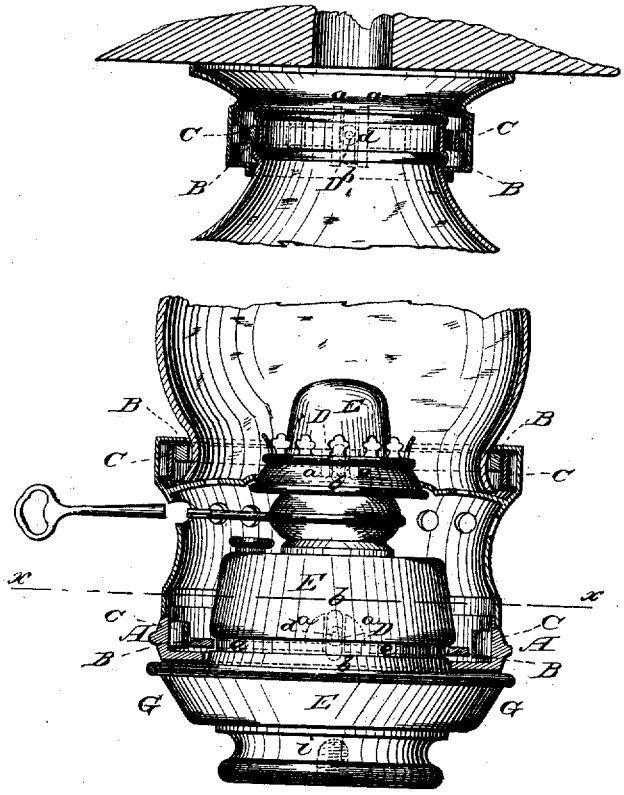
Figure 2:
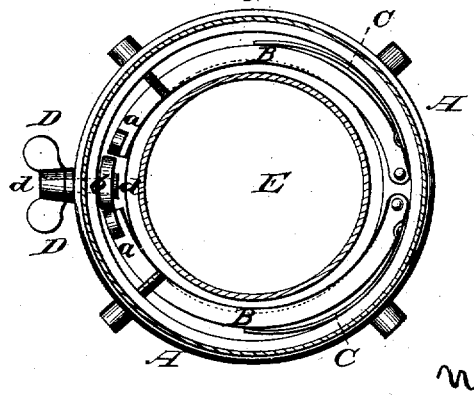

In the annexed drawing, Figure 1 is a side elevation, partly in section; and Fig. 2 is a plan view.

A represents the ordinary base or support for car-lamps, attached or suspended in any of the known and usual ways. Within the lower portion of the base A are hinged two curved or semicircular arms, B B, which are pressed inward by means of springs C C. At the free ends of the arms B B are formed lugs or projections *a a*, between which is a cam, *b*, attached to the inner end of a short shaft, *d*, passing through the base A, and provided with a handle or key, D, on its outer end. E represents the lamp proper, or the oil-reservoir, which is formed at a suitable point with a circumferential groove, *e*, as shown, which receives the arms B.

By turning the key D one-fourth of a revolution in either direction, the cam *b*, acting on the lugs *a a*, will force the arms B B outward, so that the lamp E can be inserted from underneath, and as soon as it has come to its place the key D is again turned, so as to allow the springs C C to close the arms B B, and these, entering the groove *e*, will hold the lamp firmly in its place.

By this means of fastening the lamp can be easily and quickly detached and attached, as occasion may require.

The same fastening is used in attaching the globe of the lamp, as well as the reflector, and it may be used for any other purpose to which it may be adapted.

Under the bottom of the lamp E is attached a receiving-cup, G, by means of a screw, I, which cup receives any oil that might drip from the lamp.

Having thus fully described our invention, what we claim as new, and desire to secure by Letters Patent, is—

1. The combination of the arms B, pressed inward by spring-pressure to hold the lamp, and thrown outward by a device, *b*, and the lamp E, substantially as herein set forth.

2. The lamp or reservoir E, provided with circumferential groove *e*, in combination with the arms B, held in position by spring-pressure, substantially as and for the purposes herein set forth.

3. The combination of the curved arms B B, hinged at one end, and provided with lugs *a a* at the other ends, the springs C C, cam *b*, and handle or key D, substantially as and for the purposes herein set forth.

In testimony that we claim the foregoing we have hereunto set our hands this 24th day of April, 1876.

MICHAEL HICKS.
THOMAS SMITH.

Witnesses:
JAMES RYAN,
JOHN TRIGGS.